(12) United States Patent
Tanaka (10) Patent No.: US 12,040,495 B2
(45) Date of Patent: Jul. 16, 2024

(54) ALL-SOLID-STATE BATTERY

(71) Applicant: TDK CORPORATION, Tokyo (JP)

(72) Inventor: Kazumasa Tanaka, Tokyo (JP)

(73) Assignee: TDK CORPORATION, Tokyo (JP)

( * ) Notice: Subject to any disclaimer, the term of this patent is extended or adjusted under 35 U.S.C. 154(b) by 487 days.

(21) Appl. No.: 17/294,854

(22) PCT Filed: Nov. 20, 2019

(86) PCT No.: PCT/JP2019/045364
§ 371 (c)(1),
(2) Date: May 18, 2021

(87) PCT Pub. No.: WO2020/105662
PCT Pub. Date: May 28, 2020

(65) Prior Publication Data
US 2022/0029169 A1    Jan. 27, 2022

(30) Foreign Application Priority Data

Nov. 20, 2018  (JP) .................................. 2018-217169

(51) Int. Cl.
*H01M 4/70* (2006.01)
*H01M 4/02* (2006.01)
(Continued)

(52) U.S. Cl.
CPC ......... *H01M 4/70* (2013.01); *H01M 10/0562* (2013.01); *H01M 10/0585* (2013.01);
(Continued)

(58) Field of Classification Search
CPC ............. H01M 4/70; H01M 2004/021; H01M 10/0562; H01M 10/0585
See application file for complete search history.

(56) References Cited

U.S. PATENT DOCUMENTS

2009/0202912 A1  8/2009  Baba et al.
2014/0338817 A1* 11/2014  Baba ..................... H01M 4/622
156/89.12

FOREIGN PATENT DOCUMENTS

JP    2008-198492    *  8/2008
JP    2008-198492 A       8/2008
(Continued)

OTHER PUBLICATIONS

English Translation of Jun. 29, 2023 Office Action Issued in Chinese Patent Application No. 201980075885.2.
(Continued)

*Primary Examiner* — Brittany L Raymond
(74) *Attorney, Agent, or Firm* — Oliff PLC (57) ABSTRACT

An all-solid-state battery including a laminated body in which a positive electrode having a positive electrode current collector layer and a positive electrode active material layer and a negative electrode having a negative electrode current collector layer and a negative electrode active material layer, are laminated with a solid electrolyte layer therebetween; a pair of a positive external electrode and a negative external electrode provided on one of pairs of side surfaces of the laminated body facing each other; wherein the positive electrode current collector layer is bonded to the positive external electrode and the negative electrode current collector layer is bonded to the negative external electrode; the thickness of a portion of at least one of the positive electrode current collector layer and the negative electrode current collector layer which is bonded to the positive external electrode or the negative external electrode is thicker than the other portion.

3 Claims, 4 Drawing Sheets

(51) Int. Cl.
   *H01M 10/0562*  (2010.01)
   *H01M 10/0585*  (2010.01)
(52) U.S. Cl.
   CPC .............. *H01M 2004/021* (2013.01); *H01M 2004/029* (2013.01); *H01M 2300/0068* (2013.01)

(56) References Cited

FOREIGN PATENT DOCUMENTS

| | | |
|---|---|---|
| JP | 2015-060720 A | 3/2015 |
| WO | 2007/135790 A1 | 11/2007 |

OTHER PUBLICATIONS

Feb. 25, 2020 International Search Report issued in International Patent Application No. PCT/JP2019/045364.

\* cited by examiner

ALL-SOLID-STATE BATTERY

TECHNICAL FIELD

The present disclosure relates to an all-solid-state battery.
Priority is claimed on Japanese Patent Application No. 2018-217169, filed Nov. 20, 2018, the content of which is incorporated herein by reference.

BACKGROUND ART

In recent years, the development of electronics technology has been remarkable, and portable electronic devices have been made smaller and lighter, thinner, and more multifunctional. Along with this, there is a strong demand for batteries that serve as power supplies for electronic devices to be smaller and lighter, thinner, and more reliable. Currently, in lithium ion secondary batteries that are generally used, an electrolyte (electrolytic solution) such as an organic solvent has been conventionally used as a medium for moving ions. However, in the battery having the above configuration, there is a risk that the electrolytic solution may leak out. Further, since the organic solvent and the like used in the electrolytic solution are flammable substances, a battery with higher safety is required.

As one measure for improving the safety of the battery, it has been proposed to use a solid electrolyte as an electrolyte instead of the electrolytic solution. Further, development of an all-solid-state battery in which a solid electrolyte is used as an electrolyte and other components are also composed of solids is underway.

Generally, all-solid-state batteries are classified into two types, i.e., a thin film type and a bulk type. The thin film type can be fabricated by a thin film technique such as a PVD method, a sol-gel method, or the like, and the bulk type can be fabricated through powder molding of an active material and a sulfide-based solid electrolyte with low grain boundary resistance. The thin film type has problems that a battery capacity may be small because it is difficult to make the active material thicken and to be multi-layered and manufacturing cost is high. Meanwhile, since a sulfide-based solid electrolyte is used for the bulk type and hydrogen sulfide is generated when the sulfide-based solid electrolyte reacts with water. Therefore, it is difficult to handle in the atmosphere, and there is a need to fabricate a battery in a glove box in which a dew point is managed. As described above, the thin film type and bulk type all-solid-state batteries have problems in terms of safety and manufacturing environment.

On the other hand, as an oxide-based solid electrolyte that is chemically stable in the atmosphere, a process technique for laminated parts can be applied. For example, Patent Document 1 discloses a laminated all-solid-state battery. The all-solid-state battery is characterized in that it is an all-solid-state battery which comprises a laminated material in which a positive-electrode unit and a negative-electrode unit are alternately laminated through an ion-conductive inorganic-material layer, where the positive electrode unit has positive electrode active material layers on both surfaces of a positive electrode current collector layer, the above-mentioned negative-electrode unit has negative electrode active material layers on both surfaces of a negative electrode current collector layer, at least one of the positive electrode collector layer and the negative electrode current collector layer comprises a metal of either of Ag, Pd, Au and Pt, or an alloy containing either of Ag, Pd, Au and Pt, or a mixture containing two or more kinds selected from the metals and alloys, and it is a laminated all-solid-state battery that has been fired all at once.

Further, the laminated all-solid-state battery have a positive extracting electrode that is in contact with the positive electrode current collector layer (hereinafter referred to as a positive external electrode) and a negative extracting electrode that is in contact with the negative electrode current collector layer (hereinafter referred to as a negative external electrode) at different end faces thereof, respectively.

In a laminated all-solid-state battery, the volume expansion of the active material generated by the charge/discharge reaction may cause peeling at bonding surface between the positive external electrode and the positive electrode current collector layer and at bonding surface between the negative external electrode and the negative electrode current collector layer (including the case of bonding directly and the case of bonding via another layer), and there is a concern that the cycling characteristics may be deteriorated.

CITATION LIST

Patent Literature

[Patent Literature 1] PCT International Publication No. WO2007/135790

SUMMARY OF INVENTION

Technical Problem

The present invention has been made to solve the above problems, and an object of the present invention is to provide an all-solid-state battery having excellent cycling characteristics.

Solution to Problem

An all-solid-state battery according to a first aspect of the present invention includes a laminated body in which a positive electrode having a positive electrode current collector layer and a positive electrode active material layer and a negative electrode having a negative electrode current collector layer and a negative electrode active material layer, are laminated with a solid electrolyte layer therebetween, a pair of a positive external electrode and a negative external electrode provided on one of pairs of side surfaces of the laminated body facing each other, wherein the positive electrode current collector layer is bonded to the positive external electrode and the negative electrode current collector layer is bonded to the negative external electrode, the thickness of a portion of at least one of the positive electrode current collector layer and the negative electrode current collector layer which is bonded to the positive external electrode or the negative external electrode is thicker than the other portion.

An all-solid-state battery according to a second aspect of the present invention includes a laminated body in which a positive electrode having a positive electrode current collector layer and a positive electrode active material layer and a negative electrode having a negative electrode current collector layer and a negative electrode active material layer, are laminated with a solid electrolyte layer therebetween, a pair of a positive external electrode and a negative external electrode provided on one of pairs of side surfaces of the laminated body facing each other, wherein the positive electrode current collector layer is bonded to the positive external electrode and the negative electrode current collector layer is bonded to the negative external electrode, the thickness of a portion of at least one of the positive electrode current collector layer and the negative electrode current collector layer which is bonded to the positive external electrode or the negative external electrode is thicker than the other portion, assuming that the average thickness of the thicker bonded portion, which is the portion to be bonded, is $t_1$ and the average thickness of a non-bonding portion, which is a portion other than the thicker bonded portion is $t_2$, formula (1) is satisfied;

$$1 < (t_1/t_2) \tag{1}$$

In the all-solid-state battery according to the above aspect of the present invention, wherein formula (2) is preferably satisfied;

$$(t_1/t_2) \leq 4.0 \tag{2}$$

Advantageous Effects of Invention

According to the present invention, it is possible to provide an all-solid-state battery having excellent cycling characteristics.

DESCRIPTION OF EMBODIMENTS

Hereinafter, the all-solid-state battery of the present invention will be described in detail with reference to the drawings as appropriate. The drawing used in the following description may show characterized portions in a larger size for convenience to facilitate understanding of the features of the present invention. For this reason, the dimensional ratios of each component shown in the drawings may differ from the actual ones. Materials, dimensions, etc. exemplified in the following description are examples, and the present invention is not limited thereto, but may be implemented with appropriate modifications without departing from the spirit thereof.

First Embodiment

Figure 1:
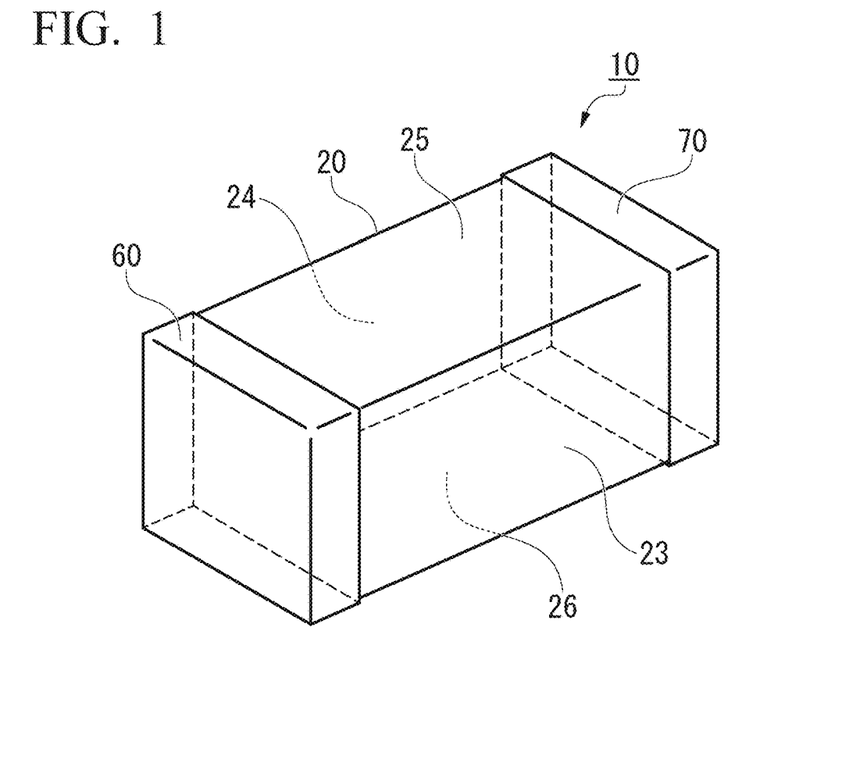
FIG. 1 is an external projection drawing of the all-solid-state battery 10 according to the embodiment of the present invention.
Figure 2:
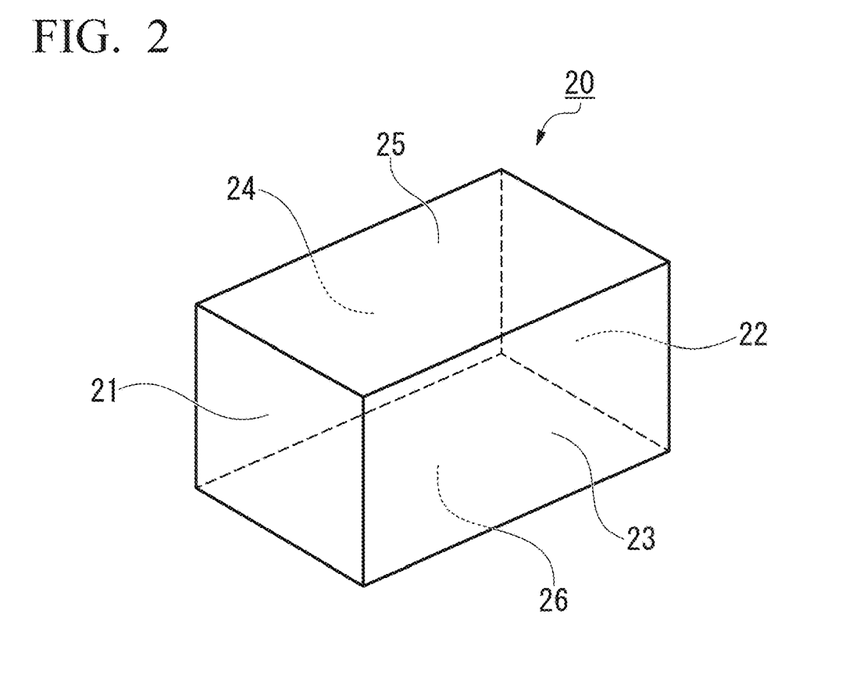
FIG. 2 is an external projection drawing of the laminated body 20 of the all-solid-state battery according to the embodiment of the present invention.

First, the first embodiment according to the present invention will be described first. In the present embodiment, as shown in FIG. 1, the all-solid-state battery 10 has a laminated body 20, a positive external electrode 60, and a negative external electrode 70. As shown in FIG. 2, the laminated body 20 in the present embodiment is a hexahedron and has four side surfaces, a side surface 21, a side surface 22, a side surface 23, a side surface 24, and an upper surface 25 and a lower surface 26. Further, the positive external electrode 60 and the negative external electrode 70 are formed on any one of the pair of side surfaces facing each other. In one embodiment of the all-solid-state battery 10 of FIG. 1, the positive external electrode 60 is formed on the side surface 21 of the laminated body 20 of FIG. 2, and the negative external electrode 70 is formed on the side surface 22.

Figure 3:
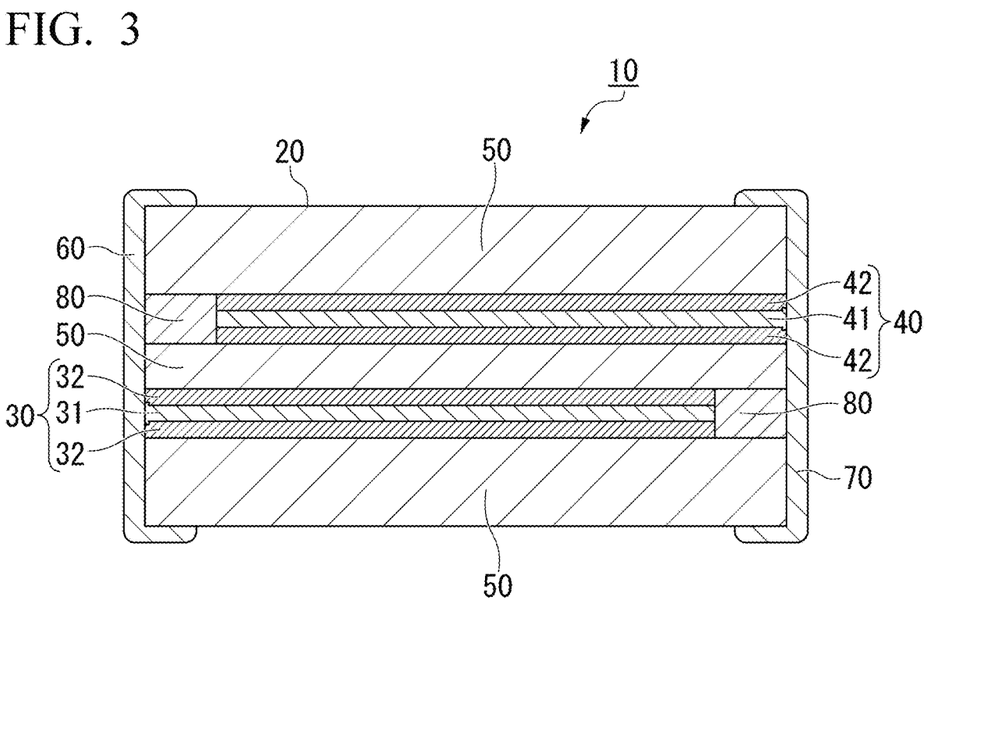
FIG. 3 is a cross-sectional view of the all-solid-state battery 10 according to the embodiment of the present invention along the side surface 23 and the side surface parallel to the side surface 24.

As shown in the cross-sectional view of the laminated body of FIG. 3, in the laminated body 20, the positive electrode 30 and the negative electrode 40 are laminated via the solid electrolyte layer 50. The positive electrode 30 has the positive electrode current collector layer 31 and the positive electrode active material layer 32. The negative electrode 40 has the negative electrode current collector layer 41 and the negative electrode active material layer 42. Further, a margin layer 80 having the same thickness as the positive electrode 30 is formed between the positive electrode 30 and the negative external electrode 70, and a margin layer 80 having the same thickness as the negative electrode 40 is formed between the negative electrode 40 and the positive external electrode 60. Further, the positive electrode 30 is electrically connected to the positive external electrode 60 via the side surface 21, and the negative electrode 40 is electrically connected to the negative external electrode 70 via the side surface 22.

This electrical connection is made by connecting the positive electrode current collector layer of the positive electrode to the positive external electrode. Similarly, for the negative electrode, the electrical connection is made by is formed by connecting the negative electrode current collector layer of the negative electrode to the negative external electrode.

As an explanation in the following specification, one or both of the positive electrode active material and the negative electrode active material may be collectively called active materials, one or both of the positive electrode current collector layer 31 and the negative electrode current collector layer 41 may be collectively called current collector layer, one or both of the positive electrode active material layer 32 and the negative electrode active material layer 42 may be collectively called active material layer, one or both of the positive electrode and the negative electrode may be collectively called electrode, and one or both of the positive external electrode 60 and the negative external electrode 70 may be collectively called external electrode.

Figure 4A:
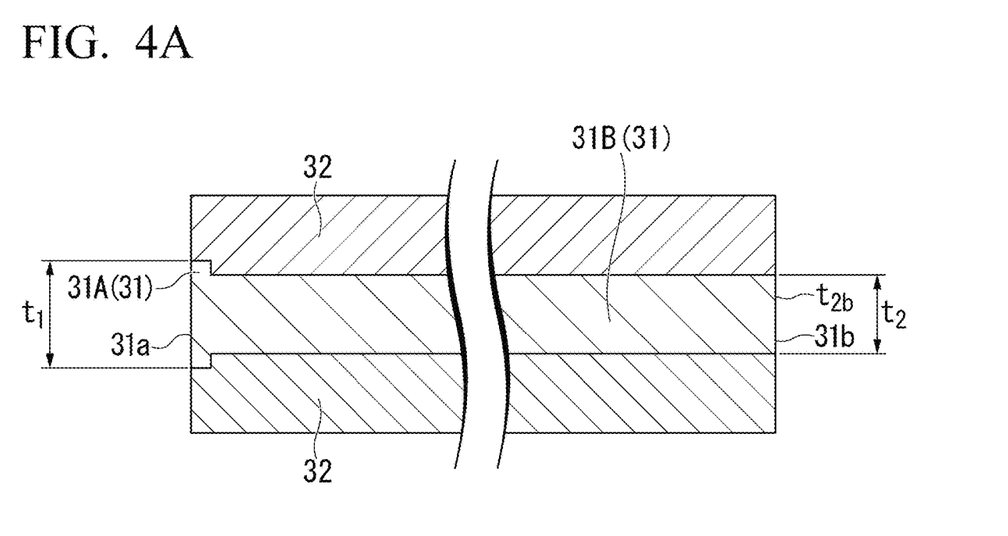
FIG. 4A is an enlarged drawing for explaining the positive electrode 30 in the same cross section as in FIG. 3.

As shown in FIG. 4A, in the positive electrode current collector layer 31, the thickness of the portion 31A bonded to the positive external electrode 60 is thicker than the average thickness of the other portion 31B. Since the positive electrode current collector layer 31 has such a configuration, the bonding area between the positive electrode current collector layer 31 and the positive external electrode 60 can be increased, and the bonding strength between the positive external electrode 60 and the positive electrode current collector layer 31 can be increased. In the following, the portion 31A may be referred to as an enlarged bonding portion 31A, and the portion 31B may be referred to as a non-enlarged portion 31B. Assuming that the thickness (length in the thickness direction) of the end face 31b on the inner side of the laminated body 20, facing the end face 31a exposed on the side surface 21 of the positive electrode current collector layer 31, is $t_2b$, the enlarged bonding portion 31A is thicker than the thickness $t_2b$ of the end face 31b at any position. The enlarged bonding portion is thicker than the inner end face of the laminated body at any position, not only in the case of a configuration in which the thickness of the enlarged bonding portion 31A changes sharply with respect to the thickness of the non-enlarged portion 31B, but also in the case of a configuration in which the thickness of the enlarged bonding portion 31A gradually and continuously changes, a configuration in which the thickness changes stepwise, or a configuration in which they are combined.

Figure 4B:
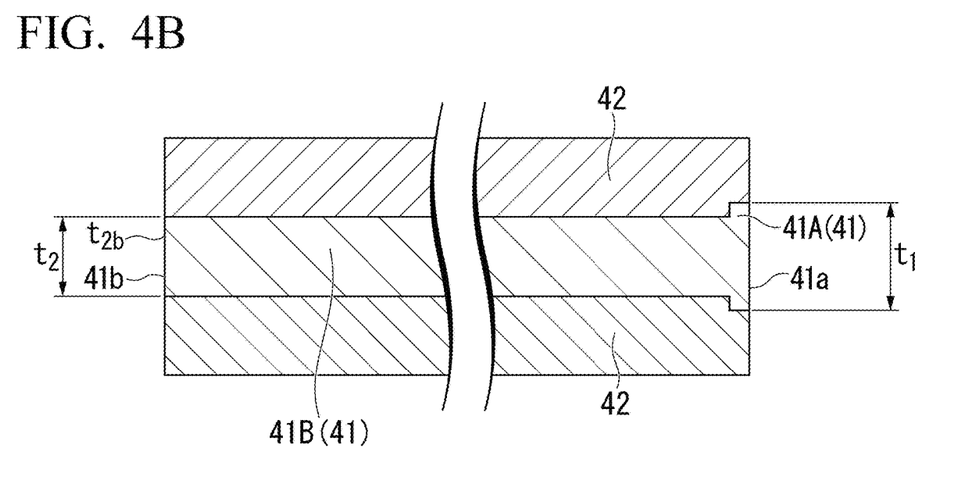
FIG. 4B is an enlarged drawing for explaining the negative electrode 40 in the same cross section as in FIG. 3.

Also, as shown in FIG. 4B, in the negative electrode current collector layer 31, the thickness of the portion 41A bonded to the negative external electrode 70 is thicker than the average thickness of the other portion 41B. Since the negative electrode current collector layer 41 has such a configuration, the bonding area between the negative electrode current collector layer 41 and the negative external electrode 70 can be increased, and the bonding strength between the negative external electrode 70 and the negative electrode current collector layer 41 can be increased. In the following, as in the case of the negative electrode current collector layer 41, as the portion 41A may be referred to as an enlarged bonding portion 41A, and the portion 41B may be referred to as a non-enlarged portion 41B.

The average thickness of the current collector layer at the enlarged bonding portion is defined as $t_1$. Further, the average thickness of the current collector layer in the non-enlarged portion is defined as $t_2$. The "average thickness" here is calculated as follows; 20 cross sections parallel to the side surface 23 and the side surface 24 are extracted so as to divide the current collector layer from the side surface 23 to the side surface 24 at equal intervals into 21 parts. The average thickness of the portion of the current collector layer exposed on the side surface 21 and the side surface 22 in the 20 cross sections and the average thickness of the portion of the current collector layer not exposed on the side surfaces are measured by cross-sectional SEM observation, and each of the average thicknesses is calculated from each average value. In the case of an all-solid-state battery in which a plurality of positive electrodes 30 and 40 are laminated, unlike the all-solid-state battery 10 shown in FIG. 3, there are a plurality of current collector layers exposed on the side surface and a plurality of current collector layers not exposed on the side surface in one cross section. In this case, in all the current collector layers in one cross section, the thickness of the current collector layer exposed on the side surface and the thickness of the current collector not exposed on the side surface are measured in each of the 20 cross sections, and then, by calculating the average value of them, $t_1$ and $t_2$ are obtained in the same manner.

It is preferable that the relationship between $t_1$ and $t_2$ satisfies $1.0 < (t_1/t_2)$, in other words, $t_1$ is set to be thicker than $t_2$. Since the current collector layer has such a configuration, the bonding area between the current collector layer and the external electrode can be increased, and the bonding strength between the external electrode and the current collector layer can be increased. By this, it is possible to prevent the external electrode and the current collector layer from peeling off due to the volume expansion and contraction of the active material layer due to the charge/discharge reaction, and as a result, an all-solid-state battery having excellent cycle characteristics can be obtained. If $t_1/t_2$ is smaller than 1.0, the bonding area between the external electrode and the current collector layer is small, so that cracks or peeling may occur on the bonding surface due to volume expansion/contraction.

Further, it is more preferable that the relationship between $t_1$ and $t_2$ satisfies $(t_1/t_2) \leq 4.0$. When $t1/t2$ exceeds 4.0, the bonding area between the external electrode and the current collector layer becomes large, but fine cracks occur due to excessive barrel polishing, and therefore, the internal resistance may increase, which may reduce the cycling characteristics.

The solid electrolyte layer 50 in the all-solid-state battery 10 according to the present embodiment preferably contains at least an oxide-based lithium ion conductor, and one or both of the positive electrode active material layer 32 and the negative electrode active material layer 42 preferably contains at least an oxide-based lithium ion conductor. The margin layer preferably contains at least an oxide-based lithium ion conductor like the solid electrolyte layer. In FIG. 3, both the positive electrode active material layer 32 and the negative electrode active material layer 42 contain the oxide-based lithium ion conductor, but one of them may contain it. Further, in FIG. 3, an example in which the same number is assigned and the same material is used is shown. The same material does not have to be used.

(Solid Electrolyte)

The solid electrolyte layer 50 in the all-solid-state battery according to the present embodiment is not particularly limited, and a general solid electrolyte material such as an oxide-based lithium ion conductor having a NACICON type, garnet type, or perovskite type crystal structure can be used. As the lithium ion conductor, at least one type of an ion conductor having a NACICON type crystal structure containing at least Li, M (M is at least one of Ti, Zr, Ge, Hf, and Sn), P and O, an ionic conductor having a garnet type crystal structure or a garnet type similar structure containing at least Li, Zr, La, and O, and an ionic conductor having a perovskite type structure containing at least Li, Ti, La, and O can be mentioned. That is, these ionic conductors may be used alone or in combination of two or more.

As the solid electrolyte material of the present embodiment, it is preferable to use a lithium ion conductor having a NACICON type crystal structure. For example, it is preferable to contain a solid electrolyte material represented by $LiZr_2(PO_4)_3$, $Li_{1.3}Al_{0.3}Ti_{1.7}(PO_4)_3$, and $Li_{1.5}Al_{0.5}Ge_{1.5}(PO_4)_3$. $LiZr_2(PO_4)_3$ is preferably one in which Z is substituted by Ca or Y, and $Li_{1.4}Ca_{0.2}Zr_{1.8}(PO_4)_3$ and $Li_{1.15}Y_{0.15}Zr_{1.85}(PO_4)_3$ can be exemplified.

(Positive Electrode Active Material and Negative Electrode Active Material)

As mentioned above, the positive electrode active material layer 32 and the negative electrode active material layer 42 include a positive electrode active material and a negative electrode active material having at least a known compound capable of occluding and releasing lithium ions as active materials. In addition, the positive electrode active material layer 32 and the negative electrode active material layer 42 may contain a conductive additive, an ion conductive assistant, a binder, and the like. It is preferable that the positive electrode active material and the negative electrode active material can efficiently insert and release lithium ions.

A transition metal oxide, a transition metal composite oxide, etc. can be used as the positive electrode active material and the negative electrode active material. Examples of the positive electrode active material and the negative electrode active material include lithium-manganese composite oxides ($Li_2Mn_aMa_{1-a}O_3$ (where $0.8 \le a \le 1$, Ma=Co, Ni)), lithium cobaltate ($LiCoO_2$), lithium nickelate ($LiNiO_2$), Lithium manganate with spinel structure ($LiMn_2O_4$), composite metal oxides represented by a general formula of $LiNi_xCo_yMn_zO_2$ (where $x+y+z=1$, $0 \le x \le 1$, $0 \le y \le 1$, $0 \le z \le 1$), a lithium vanadium compound ($LiV_2O_5$), olivine type $LiMbPO_4$ (where Mb is one or more elements selected from Co, Ni, Mn, Fe, Mg, Nb, Ti, Al, and Zr), vanadium lithium phosphate ($Li_3V_2(PO_4)_3$ or $LiVOPO_4$), Li-excess solid solution positive electrodes represented by $Li_2MnO_3$-$LiMcO_2$ (where Mc=Mn, Co, Ni), lithium titanate ($Li_4Ti_5O_{12}$), titanium oxide ($TiO_2$), composite metal oxides represented by $Li_sNi_tCo_uAl_vO_2$ (where $0.9<s<1.3$, $0.9<t+u+v<1.1$), and so on.

The positive electrode active material and the negative electrode active material of the present embodiment preferably contain a phosphoric acid compound as a main component, for example, any one or more than one of lithium vanadium phosphate ($LiVOPO_4$, $Li_3V_2(PO_4)_3$, $Li_4(VO)(PO_4)_2$), lithium vanadium pyrophosphate ($Li_2VOP_2O_7$, $Li_2VP_2O_7$) and $Li_9V_3(P_2O_7)_3(PO_4)_2$, and in particular, one or both of $LiVOPO_4$ and $Li_3V_2(PO_4)_3$.

The main component in the present embodiment means that the ratio of the phosphoric acid compound to the entire positive electrode active material and negative electrode active material in the positive electrode active material layer and the negative electrode active material layer is larger than 50 parts by mass, and the ratio of the phosphoric acid compound is preferably 80 parts by mass or more.

Further, in these positive electrode active materials and negative electrode active materials, a part of each element may be substituted with a different element, or the composition may be changed from the stoichiometric composition. $LiVOPO_4$ and $Li_3V_2(PO_4)_3$ preferably have a lithium deficiency, and $Li_xVOPO_4$ ($0.94 \le x \le 0.98$) or $Li_xV_2(PO_4)_3$ ($2.8 \le x \le 2.95$) are more preferable.

Further, as the negative electrode active material, for example, Li metal, Li—Al alloy, Li—In alloy, carbon, silicon (Si), silicon oxide ($SiO_x$), lithium titanate ($Li_4Ti_5O_{12}$), titanium oxide ($TiO_2$) can be used.

Here, there is no clear distinction between the active materials constituting the positive electrode active material layer 32 and the negative electrode active material layer 42. The potentials of the two compounds, the compound in the positive electrode active material layer and the compound in the negative electrode active material layer, are compared, the compound showing a more noble potential can be used as the positive electrode active material, and the compound showing a lower potential can be used as the negative electrode. Further, as long as it is a compound having both lithium ion release and lithium ion occlusion, the same material may be used as the material constituting the positive electrode active material layer 32 and the negative electrode active material layer 42.

Examples of the conductive additive include carbon materials such as carbon black, acetylene black, ketjen black, carbon nanotubes, graphite, graphene and activated carbon, and metal materials such as gold, silver, palladium, platinum, copper and tin.

The ion conductive assistant is, for example, a solid electrolyte. As the solid electrolyte, for example, a material similar to the material used for the solid electrolyte layer 50 can be used.

When a solid electrolyte is used as the ion conductive assistant, it is preferable that the same material is used for the ion conductive assistant and the solid electrolyte used for the solid electrolyte layer 50.

(Positive Electrode Current Collector and Negative Electrode Current Collector)

As the material constituting the positive electrode current collector layer 32 and the negative electrode current collector layer 42 of the all-solid-state battery 10 of the present embodiment, it is preferable to use a material having a large conductivity, and for example, it is preferable to use silver, palladium, gold, platinum, aluminum, copper, nickel, or the like. In particular, copper is more preferable because it does not easily react with the oxide-based lithium ion conductor and has the effect of reducing the internal resistance of the all-solid-state battery. The same material or different materials may be used as the materials constituting the positive electrode current collector layer 32 and the negative electrode current collector layer 42.

Further, it is preferable that the positive electrode current collector layer 31 and the negative electrode current collector layer 41 of the all-solid-state battery 10 of the present embodiment contain a positive electrode active material and a negative electrode active material, respectively.

It is desirable that the positive electrode current collector layer contains the positive electrode active material because the adhesion between the positive electrode current collector layer and the positive electrode active material layer is improved. It is desirable that the negative electrode current collector layer contains the negative electrode active material because the adhesion between the negative electrode current collector layer and the negative electrode active material layer is improved.

The ratio of the positive electrode active material and the negative electrode active material in the positive electrode current collector layer 31 and the negative electrode current collector layer 41 of the present embodiment is not particularly limited as long as it functions as a current collector. The positive electrode current collector and the positive electrode active material, or the negative electrode current collector and the negative electrode active material are preferably in the range of 90/10 to 70/30 in volume ratio.

(Margin Layer)

The margin layer 80 of the all-solid-state battery 10 of the present embodiment is preferably provided in order to eliminate the step between the solid electrolyte layer 50 and the positive electrode 30 and the step between the solid electrolyte layer 50 and the negative electrode 40. The margin layer 80 shows a region other than the positive electrode 30. Due to the presence of such a margin layer 80, the step between the solid electrolyte layer 50 and the positive electrode 30, and the step between the solid electrolyte layer 50 the negative electrode 40 are eliminated, so that the denseness of the electrode increases and delamination and warpage due to firing of the all-solid-state battery 10 are less likely to occur.

The material constituting the margin layer 80 preferably contains, for example, the same material as the solid electrolyte layer 50. Therefore, it preferably contains an oxide-based lithium ion conductor having a NACICON type, garnet type, or perovskite type crystal structure. As the lithium ion conductor, at least one type of an ion conductor having a NACICON type crystal structure containing at least Li, M (M is at least one of Ti, Zr, Ge, Hf, and Sn), P and O, an ionic conductor having a garnet type crystal structure or a garnet type similar structure containing at least Li, Zr, La, and O, and an ionic conductor having a perovskite type structure containing at least Li, Ti, La, and O can be mentioned. That is, these ionic conductors may be used alone or in combination of two or more.

(Manufacturing Method of All-Solid-State Battery)

The all-solid-state battery 10 of the present embodiment can be manufactured by the following procedure. Each material of the positive electrode current collector layer 31, the positive electrode active material layer 32, the solid electrolyte layer 50, the negative electrode current collector layer 41, the negative electrode active material layer 42, and the margin layer 80 is made into a paste. The method of making a paste is not particularly limited, and for example, a paste can be obtained by mixing the powder of each of the above materials with a vehicle. Here, vehicle is a general term for a medium in a liquid phase, and includes a solvent, a binder, and the like. The binder contained in the paste for forming the green sheet or the print layer is not particularly limited, but polyvinyl acetal resin, cellulose resin, acrylic resin, urethane resin, vinyl acetate resin, polyvinyl alcohol resin, etc. can be used, and the slurry can contain at least one of these resins.

In addition, the paste may contain a plasticizer. The type of plasticizer is not particularly limited, but phthalates such as dioctyl phthalate and diisononyl phthalate may be used.

By such a method, a paste for a positive electrode current collector layer, a paste for a positive electrode active material layer, a paste for a solid electrolyte layer, a paste for a negative electrode active material layer, a paste for a negative electrode current collector layer, and a paste for a margin layer are produced.

The prepared solid electrolyte layer paste is applied on a substrate such as polyethylene terephthalate (PET) to a desired thickness and dried if necessary to prepare a solid electrolyte green sheet (solid electrolyte layer) 50. The method for producing the green sheet for a solid electrolyte is not particularly limited, and a known method such as a doctor blade method, a die coater, a comma coater, or a gravure coater can be adopted. Next, the positive electrode active material layer 32, the positive electrode current collector layer 31, and the positive electrode active material layer 32 are printed and laminated in this order on the solid electrolyte green sheet (solid electrolyte layer) 50 by screen printing to form the positive electrode 30. Further, in order to fill the step between the solid electrolyte green sheet (solid electrolyte layer) 50 and the positive electrode 30, a margin layer 80 is formed by screen printing in a region other than the positive electrode to prepare a positive electrode unit.

The negative electrode unit can also be manufactured by the same method as the positive electrode unit.

Then, the positive electrode unit and the negative electrode unit are alternately offset and laminated so that one end of each unit does not match, and a laminated substrate containing a plurality of elements of the all-solid-state battery is produced. If necessary, outer layers can be provided on both main surfaces of the laminated substrate. The same material as the solid electrolyte can be used for the outer layer, and a green sheet for the solid electrolyte can be used.

The manufacturing method is for manufacturing a parallel type all-solid-state battery 10, and in the method for manufacturing a series-type all-solid-state battery, one end of the positive electrode and one end of the negative electrode may be aligned with each other, that is, they may be stacked without offsetting. In this all-solid-state battery, each current collector layer is bonded to an external electrode on opposite end faces, and from the viewpoint of increasing the bonding strength, it is preferable to have enlarged bonding portions on both end faces.

Further, the produced laminated substrate can be collectively pressed by a mold press, a hot water isotropic press (WIP), a cold water isotropic press (CIP), a hydrostatic press, or the like to improve the adhesion. Pressurization is preferably performed while heating, and can be performed, for example, at 40 to 95° C.

The produced laminated substrate can be cut into a laminated body 20 of an unfired all-solid-state battery using a dicing device.

The laminated body 20 is sintered by de-binding and firing the laminated body 20 of the all-solid-state battery. De-binding and firing can be performed at a temperature of 600° C. to 1000° C. in a nitrogen atmosphere. The holding time for de-binding and firing is, for example, 0.1 to 6 hours.

(Forming Method of the Enlarged Bonding Portion)

The enlarged bonding portion can be formed by using a known molding/processing method. As an example, there is a method of extending the current collector layers 31 and 41 exposed on the side surfaces 21 and 22 of the laminated body 20 by barrel polishing in the laminating direction.

Barrel polishing may be carried out on the unfired all-solid-state battery laminate body 20 or on the fired all-solid-state battery laminate body 20. Barrel polishing methods include dry barrel polishing without water and wet barrel polishing with water. When performing wet barrel polishing, an aqueous solution such as water is separately charged into the barrel polishing machine.

The barrel processing conditions are not particularly limited and can be adjusted as appropriate, and it is not limited to this as long as t1 can be increased within a range in which defects such as cracks and chips do not occur in the laminated body.

First, the average thickness of t1 can be increased by putting the sintered laminate body 20, the abrasive, and the cushioning material into the barrel of the barrel polishing machine and rotating the barrel. The rotation speed may be 30 to 100 rpm, and the processing time may be about 1 to 5 hours. If the thickness of the current collector layer extending to the side surface increases due to the collision between the laminated bodies, the amount of water, abrasives, and cushioning material charged into the barrel may be reduced, or the amount charged into the barrel may be omitted.

The barrel shape used for barrel polishing is preferably cylindrical or polygonal cast, and the shape can be appropriately changed depending on the polishing conditions. The size of the barrel is not particularly limited.

As the abrasive to be put into the barrel, media such as alumina, zirconia, polymer, and metal can be used. The size of the media used as the abrasive is preferably 0.5 mm or more and 10 mm or less in diameter. As the cushioning material, for example, a solution such as water or an organic solvent, or an organic fine powder such as a protein, a polysaccharide or a polymer can be used. The size of the medium used as the cushioning material for the organic fine powder is preferably 0.01 mm or more and 1 mm or less in diameter. The abrasive material and the cushioning material may be used alone, or a plurality of types may be mixed and used. Further, it is preferable that the amount of the laminated body, the abrasive, and the cushioning material put into the barrel is 80% or more and 100% or less of the barrel volume, and the solid content of the abrasive and the cushioning material is preferably 50% or more and 70% or less of the barrel volume.

Further, in order to efficiently draw the current from the laminated body 20 of the all-solid-state battery, external electrodes (positive external electrode 60 and negative external electrode 70) can be provided. As for the external electrodes, a positive external electrode 60 and a negative external electrode 70 are formed on any of pairs of opposite side surfaces of the laminated body 20. Examples of the method for forming the external electrode include a sputtering method, a screen printing method, and a dip coating method. In the screen printing method and the dip coating method, a paste for an external electrode containing a metal powder, a resin, and a solvent is prepared and formed as the external electrode 6. Next, a baking step for removing the solvent and a plating process for forming the terminal electrode on the surface of the external electrode are performed. On the other hand, in the sputtering method, since the external electrode and the terminal electrode can be directly formed, the baking step and the plating process are not required.

The laminated body 20 of the all-solid-state battery may be sealed in, for example, a coin cell in order to enhance moisture resistance and impact resistance. The sealing method is not particularly limited, and for example, the laminated body after firing may be sealed with a resin. Further, an insulating paste having an insulating property such as $Al_2O_3$ may be applied or dip-coated around the laminated body, and the insulating paste may be sealed by heat treatment.

Second Embodiment

Next, the all-solid-state battery according to the second embodiment of the present invention will be described. In the description of the second embodiment, the same reference numerals are given to the configurations common to the all-solid-state battery 10 of the first embodiment, and the description thereof will be omitted.

Figure 5:
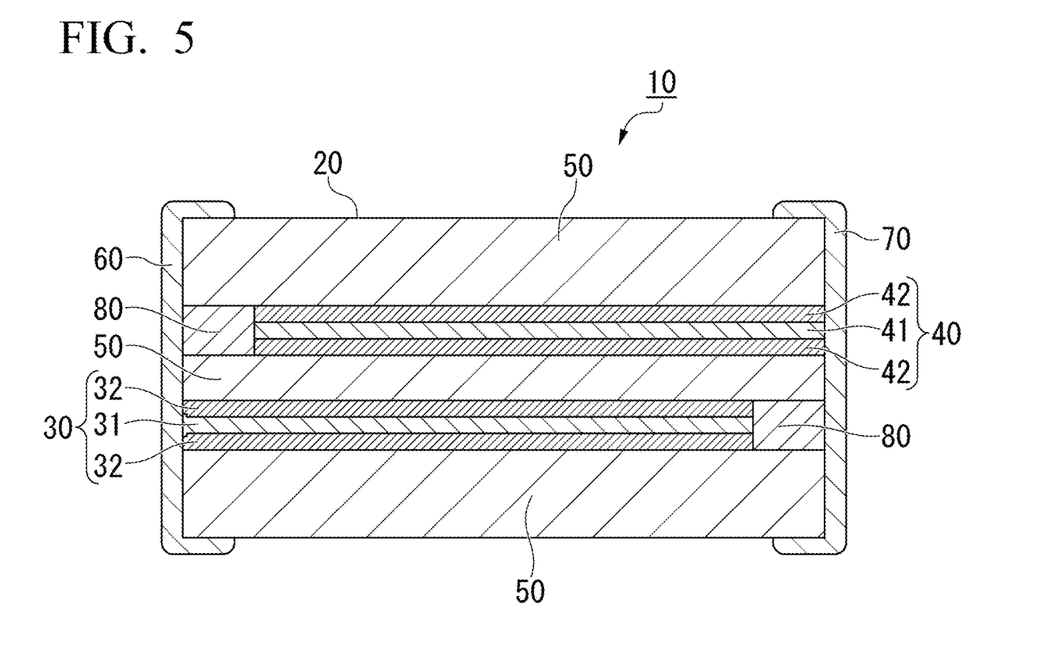
FIG. 5 is a parallel sectional view of the all-solid-state battery 10 according to another embodiment of the present invention with respect to the side surface 23 and the side surface 24.

In the all-solid-state battery according to the present embodiment, only the current collector layer of either the positive electrode or the negative electrode has an enlarged bonding portion. In the example shown in FIG. 5, only the positive electrode 30 has an enlarged bonding portion in the positive electrode current collector layer 31, and the negative electrode 40 does not have an enlarged bonding portion in the negative electrode current collector layer 41. As for such a configuration, as in the first embodiment, the stress load due to volume expansion is relaxed, cracks in the all-solid-state battery are suppressed as compared to the conventional configuration, and as a result, it is possible to provide an all-solid-state battery having excellent cycle characteristics. In the example shown in FIG. 5, only the positive electrode has a configuration in which the current collector layer has an enlarged bonding portion. The same effect can be achieved by configuring only the negative electrode to have an enlarged bonding portion in the current collector layer.

The present embodiment is different from the first embodiment in that the side surface 21 of the laminated body 20 is covered with a coating material and then barrel polishing is performed. By coating one side surface 21 with a coating material, it is possible to prevent the side surface 21 side from being polished during barrel polishing. For this reason, the thickness of only the negative electrode current collector layer exposed on the side surface 22 can be changed without changing the thickness of the positive electrode current collector layer exposed on the side surface 21. The coating material is not particularly limited, but polyvinylidene fluoride (PVdF) or the like can be used. After barrel polishing using the coating material, the coating material can be washed and removed with an organic solvent. The organic solvent is not particularly limited, and examples thereof include N-methyl-2-pyrrolidone.

Although the embodiment according to the present invention has been described in detail above, the embodiment is not limited to the above embodiment and can be variously modified.

EXAMPLES

Hereinafter, the present invention will be described in more detail with reference to Examples and Comparative Examples based on the above-described embodiment, but the present invention is not limited to these examples. In addition, unless otherwise specified, the "parts" indication of the amount of the material charged in the preparation of the paste means "parts by mass".

Example 1

(Preparation of Positive Electrode Active Material and Negative Electrode Active Material)

As the positive electrode active material and the negative electrode active material, vanadium lithium phosphate ($Li_3V_2(PO_4)_3$) prepared by the following method was used. As the manufacturing method, using $Li_2CO_3$, $V_2O_5$ and $NH_4H_2PO_4$ as starting materials, wet mixing was performed in a ball mill for 16 hours, the powder obtained after dehydration drying was calcined at 850° C. for 2 hours in a nitrogen-hydrogen mixed gas. The calcined product was wet-pulverized with a ball mill and then dehydrated and dried to obtain a positive electrode active material powder and a negative electrode active material powder. It was confirmed by using ICP emission spectroscopy and an X-ray diffractometer that the composition and crystal structure of the prepared powder were $Li_3V_2(PO_4)_3$.

(Preparation of Paste for Positive Electrode Active Material Layer and Paste for Negative Electrode Active Material Layer)

For preparation of paste for positive electrode active material layer and paste for negative electrode active material layer, 15 parts of ethyl cellulose as a binder and 65 parts of dihydroterpineol as a solvent were added to 100 parts of $Li_3V_2(PO_4)_3$ powder, and mixed and dispersed to prepare a paste for a positive electrode active material layer and a paste for a negative electrode active material layer.

(Preparation of Paste for Solid Electrolyte Layer)

As the solid electrolyte, titanium aluminum lithium phosphate ($Li_{1.3}Al_{0.3}Ti_{1.7}(PO_4)_3$) prepared by the following method was used. In the manufacturing method, using $Li_2CO_3$, $Al_2O_3$, $TiO_2$ and $NH_4H_2PO_4$ as starting materials as starting materials, wet mixing was performed in a ball mill for 16 hours, the powder obtained after dehydration drying was calcined at 850° C. for 2 hours in the air. The calcined product was wet-pulverized with a ball mill and then dehydrated and dried to obtain an electrode active material powder.

(X-Ray Diffraction Pattern)

The X-ray diffraction pattern of the crystal structure of the solid electrolyte powder was measured using CuKα rays. As a result of analyzing the obtained X-ray diffraction pattern, since it showed the same X-ray diffraction pattern as $LiTi_2(PO_4)_3$ (lithium titanate) of ICDD card 35-0754, it was confirmed that it had a NACICON type crystal structure.

Next, 100 parts of ethanol and 200 parts of toluene were added as solvents to this powder and wet-mixed with a ball mill. Then, 16 parts of a polyvinyl butyral-based binder and 4.8 parts of benzyl butyl phthalate were further added and mixed to prepare a paste for a solid electrolyte layer.

(Preparation of Sheet for Solid Electrolyte Layer)

A sheet of the solid electrolyte layer paste was formed by a doctor blade method using a PET film as a base material to obtain a solid electrolyte layer sheet (solid electrolyte layer) having a thickness of 15 μm.

(Preparation of Paste for Positive Electrode Current Collector Layer and Paste for Negative Electrode Current Collector Layer)

As a positive electrode current collector and a negative electrode current collector, Cu and $Li_3V_2(PO_4)_3$ are mixed so as to have a volume ratio of 80/20, and then 10 parts of ethyl cellulose as a binder and 50 parts of dihydroterpineol as a solvent are added. The mixture was mixed and dispersed to prepare a paste for the positive electrode current collector layer and a paste for the negative electrode current collector layer.

(Preparation of Paste for Margin Layer)

The paste for the margin layer is prepared by adding 100 parts of ethanol and 100 parts of toluene as solvents to the powder of $Li_{1.3}Al_{0.3}Ti_{1.7}(PO_4)_3$ and wet-mixing them with a ball mill, and then 16 parts of a polyvinyl butyral binder and phthalic acid 4.8 parts of benzyl butyl was further added and mixed to prepare a paste for a margin layer.

(Preparation of External Electrode Paste)

A thermosetting external electrode paste was prepared by mixing and dispersing silver powder, an epoxy resin, and a solvent.

Using these pastes, an all-solid-state battery was prepared as follows.

(Manufacturing of Positive Electrode Unit)

A positive electrode active material layer having a thickness of 5 μm (referred to as a first positive electrode active material layer) was formed on the solid electrolyte layer sheet by screen printing, and dried at 80° C. for 10 minutes. Next, a positive electrode current collector layer having a thickness of 5 μm was formed on the positive electrode active material layer by screen printing, and dried at 80° C. for 10 minutes. Further, a positive electrode active material layer having a thickness of 5 μm (referred to as a second positive electrode active material layer) is formed again by screen printing on the positive electrode current collector layer, a positive electrode was prepared on the sheet for the solid electrolyte layer by drying at 80° C. for 10 minutes. Next, a margin layer 80 having substantially the same height as the positive electrode was formed on the outer periphery of one end of the positive electrode by screen printing, and dried at 80° C. for 10 minutes. Then, the PET film was peeled off to obtain a sheet of the positive electrode unit.

(Manufacturing of Negative Electrode Unit)

A negative electrode active material layer having a thickness of 5 μm (referred to as a first negative electrode active material layer) was formed on the solid electrolyte layer sheet by screen printing, and dried at 80° C. for 10 minutes. Next, a negative electrode current collector layer having a thickness of 5 μm was formed on the negative electrode active material layer by screen printing, and dried at 80° C. for 10 minutes. Further, a negative electrode active material layer having a thickness of 5 μm (referred to as a second negative electrode active material layer) is formed again by screen printing on the negative electrode current collector layer, a negative electrode was prepared on the sheet for the solid electrolyte layer by drying at 80° C. for 10 minutes.

Next, a margin layer 80 having substantially the same height as the negative electrode was formed on the outer periphery of one end of the negative electrode by screen printing, and dried at 80° C. for 10 minutes. Then, the PET film was peeled off to obtain a sheet of the negative electrode unit.

(Fabrication of Laminated Body)

A plurality of positive electrode units and negative electrode units were alternately laminated while being offset so that one end of each unit did not match, and a laminated substrate was produced. Further, a plurality of solid electrolyte sheets were laminated as outer layers on both main surfaces of the laminated substrate, and an outer layer of 500 μm was provided. This was bonded by thermocompression using a die press and then cut to prepare an unfired all-solid-state battery laminate. Next, the laminate was de-binded and fired to obtain a laminated body of an all-solid-state battery. The firing was carried out in nitrogen at a temperature rising rate of 200° C./hour to a firing temperature of 750° C., maintained at that temperature for 2 hours, and taken out after natural cooling.

As a result of measuring the average thicknesses $t_1$ and $t_2$ of the current collector layer exposed on the two side surfaces facing each other and the current collector layer not exposed on the two side surfaces facing each other in the laminated body after firing, and it was confirmed that $t_1$ was 2.1 μm and $t_2$ was 3.0 μm. Regarding the reason why the thickness of the current collector layer exposed on the two side surfaces facing each other in the laminated body after firing is smaller than the thickness of the current collector layer not exposed on the two side surfaces facing each other, since the current collector layer exposed on the side surface is more susceptible to thermal influence by firing than the current collector layer inside the laminated body, the thickness of the current collector layer exposed on the side surface tends to be small.

(Barrel Polishing)

In the laminated body, the thickness of the current collector layer exposed on the two opposite side surfaces was extended by barrel polishing, and the thickness was increased. The barrel polishing was performed wet.

The laminated body, water, and zirconia media having a diameter of 1 mm as an abrasive and potato starch having a diameter of 30 μm as a cushioning material at a ratio of 4:1 were put into a barrel container, it was rotated at 50 rpm, the barrel time was as shown in Table 1, and the thickness $t_1$ of the current collector layer exposed on the two opposite side surfaces of the laminated body was extended. Then, barrel polishing was performed so that the thickness $t_1$ of the current collector layer was 3.3 μm. Then, after barrel polishing, it was washed and dried to obtain a laminated body of all-solid-state batteries according to Example 1.

After barrel polishing, 20 cross sections parallel to the two side surfaces facing each other on which the current collector layer is not exposed are extracted so as to divide the current collector layer from the one side to the other side facing each other at equal intervals into 21 parts, and the average thickness of the portion of the current collector layer exposed on the side surface in the 20 cross sections and the average thickness of the portion of the current collector layer not exposed on the side surface are measured by cross-sectional SEM observation. Then, the $t_1$ and $t_2$ were calculated, respectively. The results are shown in Table 1.

(External Electrode Forming Process)

In the barrel-polished all-solid-state battery laminated body, an external electrode paste is applied to two side surfaces facing each other where the current collector is exposed, and thermosetting is performed at 150° C. for 30 minutes to form a pair of external electrodes.

Examples 2 to 7

The all-solid-state batteries according to Examples 2 to 7 were produced in the same manner as in Example 1 except that $t_1$ was adjusted to have the thickness shown in Table 1 by setting the barrel time for barrel polishing as shown in Table 1.

Example 8

The all-solid-state batteries according to Example 8 was produced in the same manner as in Example 4 except that the side surface of the laminated body where the negative electrode current collector layer is exposed is covered with polyvinylidene fluoride (PVdF) and then barrel-polished, only the positive electrode current collector layer exposed on the side surface facing the side surface is adjusted to have the thickness shown in Table 1. After barrel polishing, the PVdF was removed by washing with an organic solvent of N-methyl-2-pyrrolidone.

Example 9

The all-solid-state battery according to Example 9 was produced in the same manner as in Example 8 except that the side surface of the laminated body where the negative electrode current collector layer is exposed is coated with PVdF and then barrel-polished.

Comparative Example 1

The all-solid-state battery according to Comparative Example 1 was an all-solid-state battery without barrel polishing.

Comparative Example 2

The all-solid-state battery according to Comparative Example 2 was produced in the same manner as in Example 1 except that $t_1$ was adjusted to have the thickness shown in Table 1 by setting the barrel time for barrel polishing as shown in Table 1.

(Battery Evaluation)

The all-solid-state batteries produced in the examples and the comparative examples can be evaluated for the following battery characteristics.

[Charge/Discharge Cycling Test]

The charge/discharge cycling characteristics of the all-solid-state batteries produced in the examples and the comparative examples can be evaluated, for example, under the charge/discharge conditions shown below. For the notation of charge/discharge current, the C rate notation will be used hereafter. The C rate is expressed as nC (or µA) (n is a numerical value) and means a current capable of charging and discharging the nominal capacitance (µAh) at 1/n (h). For example, 1 C means a charge/discharge current capable of charging the nominal capacity in 1 h, and 2 C means a charge/discharge current capable of charging the nominal capacity in 0.5 h. For example, in the case of an all-solid-state battery having a nominal capacity of 100 µAh, the current of 0.1 C is 10 µA (calculation formula 100 µA×0.1=10 µA). Similarly, the current of 0.2 C is 20 µA, and the current of 1 C is 100 µA.

The charge/discharge cycling test conditions include performing constant current charging (CC charging) at a constant current of a rate of 0.2 C until the battery voltage reaches 1.6 V in an environment of 25° C., and then a constant current of a rate of 0.2 C until the battery was discharged until the battery voltage reaches 0 V (CC discharge). The charging and discharging were regarded as one cycle, and the discharge capacity retention rate after repeating this up to 1000 cycles was evaluated as the charge/discharge cycling characteristics. The charge/discharge cycling characteristics in the present embodiment were calculated by the following formula.

Discharge capacity retention rate after 1000 cycles (%)=(Discharge capacity after 1000 cycles÷Discharge capacity after 1 cycle)×100

(Results)

Figure 6:
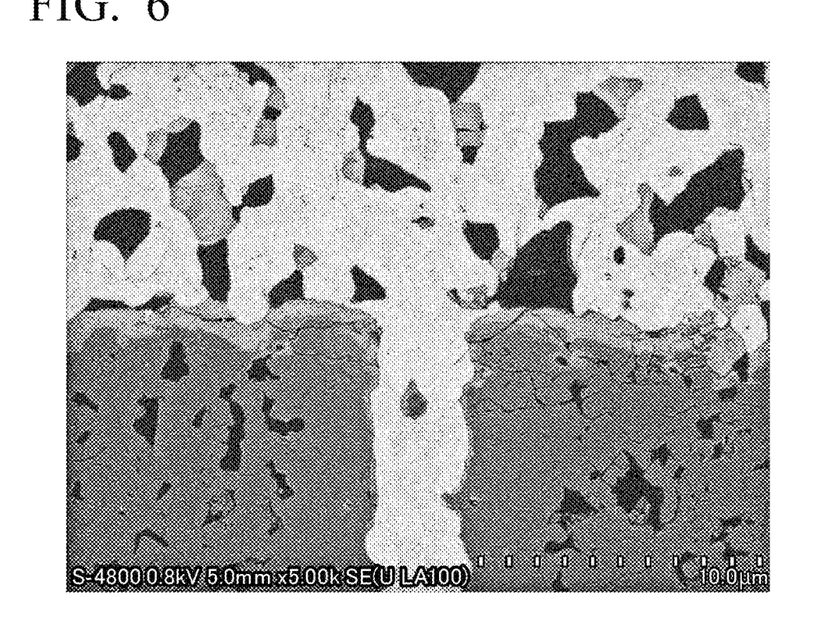
FIG. 6 is an FE-SEM photograph of a cross section perpendicular to the positive external electrode and the negative external electrode of the all-solid-state battery according to Example 6.
Figure 7:
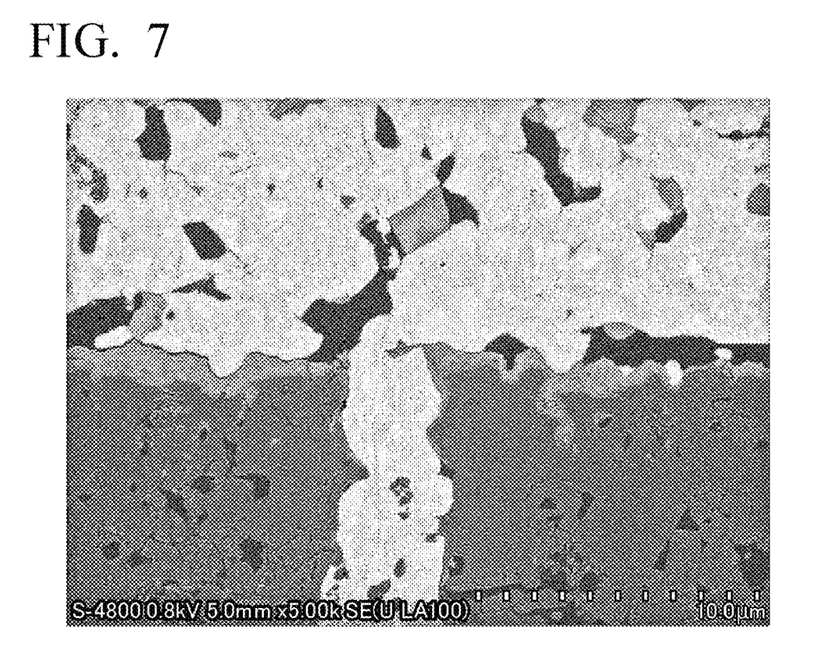
FIG. 7 is an FE-SEM photograph of a cross section perpendicular to the positive external electrode and the negative external electrode of the all-solid-state battery according to Comparative Example 1.

As a representative, FE-SEM photographs of cross sections of the all-solid-state batteries according to Example 6 and Comparative Example 1 are shown in FIGS. 6 and 7. As shown in FIG. 6, in Example 6, it was confirmed that the thickness of the positive electrode current collector layer exposed on the side surface of the laminated body of the all-solid-state battery was extended in the laminating direction. Although the figure is omitted, it was confirmed that the negative electrode current collector layer was similarly extended in the laminating direction. On the other hand, as described in FIG. 7, in the cross-sectional photograph of the all-solid-state battery according to Comparative Example 1, it could not be confirmed that the thickness of the positive electrode current collector layer was extended at the portion exposed on the end face of the laminated body. Although the figure is omitted, it could not be confirmed that the thickness of the negative electrode current collector layer was similarly extended in the laminating direction.

Table 1 shows the results of the cycling characteristics of the all-solid-state batteries according to Examples 1 to 9 and Comparative Examples 1 and 2. It was confirmed that the all-solid-state battery according to Examples 1 to 7, in which the average thickness $t_1$ of the enlarged bonding portion of the current collector layer exposed on the side surface of the laminated body of the all-solid-state battery is larger than the average thickness $t_2$ of the non-bonding portions other than the enlarged bonding portion, have excellent cycling characteristics as compared with the all-solid-state battery according to the Comparative Examples. In particular, when $1.0<t_1/t_2\leq4.0$ was satisfied, more excellent cycling characteristics were confirmed. Further, from the results of the all-solid-state batteries according to Examples 8 to 9, even when the average thickness of the enlarged bonding portion of the current collector layer exposed on the side surface of either the positive electrode or the negative electrode is larger than the average thickness $t_2$ of the non-bonding portion other than the enlarged bonding portion, it was confirmed that the action and effect according to the present invention can be obtained. On the other hand, the all-solid-state batteries according to Comparative Examples 1 and 2 in which the average thickness $t_1$ of the enlarged bonding portion of the current collector layer exposed on the side surface is equal to or less than the average thickness $t_2$ of the non-bonding portion not exposed on the side surface have a low cycling characteristics.

TABLE 1

| | BARREL TIME [min] | POSITIVE ELECTRODE | | | NEGATIVE ELECTRODE | | | CYCLING CHARACTERISTICS [%] |
|---|---|---|---|---|---|---|---|---|
| | | $t_1$ [um] | $t_2$ [um] | $t_1/t_2$ | $t_1$ [um] | $t_2$ [um] | $t_1/t_2$ | |
| COMPARATIVE EXAMPLE 1 | 0 | 2.1 | 3.0 | 0.7 | 2.1 | 3.0 | 0.7 | 74 |
| COMPARATIVE EXAMPLE 2 | 20 | 3.0 | 3.0 | 1.0 | 3.0 | 3.0 | 1.0 | 75 |
| EXAMPLE 1 | 25 | 3.3 | 3.0 | 1.1 | 3.3 | 3.0 | 1.1 | 83 |
| EXAMPLE 2 | 40 | 3.9 | 3.0 | 1.3 | 3.9 | 3.0 | 1.3 | 84 |
| EXAMPLE 3 | 60 | 4.5 | 3.0 | 1.5 | 4.5 | 3.0 | 1.5 | 85 |
| EXAMPLE 4 | 100 | 6.0 | 3.0 | 2.0 | 6.0 | 3.0 | 2.0 | 85 |
| EXAMPLE 5 | 200 | 9.0 | 3.0 | 3.0 | 9.0 | 3.0 | 3.0 | 84 |
| EXAMPLE 6 | 400 | 12.0 | 3.0 | 4.0 | 12.0 | 3.0 | 4.0 | 84 |
| EXAMPLE 7 | 500 | 12.3 | 3.0 | 4.1 | 12.3 | 3.0 | 4.1 | 81 |
| EXAMPLE 8 | 100 | 6.0 | 3.0 | 2.0 | 2.4 | 3.0 | 0.8 | 81 |
| EXAMPLE 9 | 190 | 2.4 | 3.0 | 0.8 | 6.0 | 3.0 | 2.0 | 80 |

Although the present invention has been described in detail above, the above-described embodiments and examples are merely examples, and the inventions disclosed herein include various modifications and modifications of the above-mentioned specific examples.

REFERENCE SIGNS LIST 10 all-solid-state battery
20 laminated body
30 positive electrode
31 positive electrode current collector
32 positive electrode active material layer
40 negative electrode
41 negative electrode current collector
42 negative electrode active material layer
50 solid electrolyte layer
60 positive external electrode
70 negative external electrode
80 margin layer

What is claimed is:

1. An all-solid-state battery comprising:
a laminated body in which a plurality of positive electrodes having a positive electrode current collector layer and a positive electrode active material layer and a plurality of negative electrodes having a negative electrode current collector layer and a negative electrode active material layer, are laminated with a solid electrolyte layer therebetween;
a pair of a positive external electrode and a negative external electrode provided on one of pairs of side surfaces of the laminated body facing each other;
wherein each of the positive electrode current collector layers and the positive electrode active material layers are bonded to the positive external electrode, and each of the negative electrode current collector layers and the negative electrode active material layers are bonded to the negative external electrode;
the thickness of a portion of each of all positive electrode current collector layers at a position which is bonded to the positive external electrode is thicker than a non-bonded portion to the positive external electrode, or
the thickness of a portion of each of all negative electrode current collector layers at a position which is bonded to the negative external electrode is thicker than a non-bonded portion to the negative external electrode, or
the thickness of a portion of each of all positive electrode current collector layers at a position which is bonded to the positive external electrode is thicker than a non-bonded portion to the positive external electrode and the thickness of a portion of each of all negative electrode current collector layers at a position which is bonded to the negative external electrode is thicker than a non-bonded portion to the negative external electrode.

2. An all-solid-state battery comprising:
a laminated body in which a plurality of positive electrodes having a positive electrode current collector layer and a positive electrode active material layer and a plurality of negative electrodes having a negative electrode current collector layer and a negative electrode active material layer, are laminated with a solid electrolyte layer therebetween;
a pair of a positive external electrode and a negative external electrode provided on one of pairs of side surfaces of the laminated body facing each other;
wherein each of the positive electrode current collector layers and the positive electrode active material layers are bonded to the positive external electrode, and each of the negative electrode current collector layers and the negative electrode active material layers are bonded to the negative external electrode;
the thickness of a portion of each of all positive electrode current collector layers at a position which is bonded to the positive external electrode is thicker than a non-bonded portion to the positive external electrode, or
the thickness of a portion of each of all negative electrode current collector layers at a position which is bonded to the negative external electrode is thicker than a non-bonded portion to the negative external electrode, or
the thickness of a portion of each of all positive electrode current collector layers at a position which is bonded to the positive external electrode is thicker than a non-bonded portion to the positive external electrode and the thickness of a portion of each of all negative electrode current collector layers at a position which is bonded to the negative external electrode is thicker than a non-bonded portion to the negative external electrode;
assuming that the average thickness of an enlarged bonded portion, which is the portion to be bonded, is $t_1$ and the average thickness of the non-bonded portion; is $t_2$, formula (1) is satisfied;

$$1 < (t_1/t_2) \tag{1}$$

3. The all-solid-state battery according to claim 2, wherein formula (2) is satisfied;

$$(t_1/t_2) \leq 4.0 \tag{2}$$

* * * * *